(No Model.)
G. W. DAVIS.
APPARATUS FOR PRODUCING STAGE EFFECTS.
No. 359,243. Patented Mar. 15, 1887.
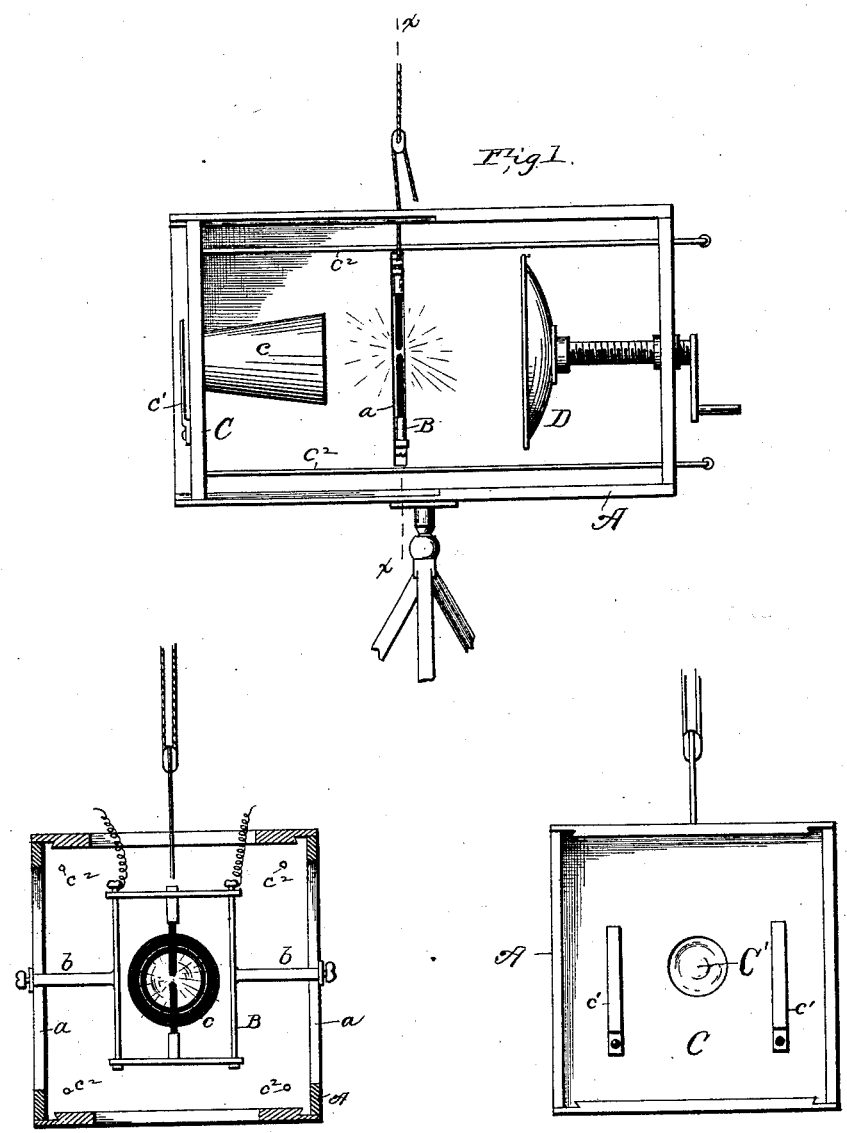
Witnesses
Inventor
Greer W. Davis
By his Attorney

UNITED STATES PATENT OFFICE.

GREER W. DAVIS, OF NEW ALBANY, INDIANA, ASSIGNOR OF ONE-HALF TO JOHN H. STOTSENBURG, OF SAME PLACE.

APPARATUS FOR PRODUCING STAGE EFFECTS.

SPECIFICATION forming part of Letters Patent No. 359,243, dated March 15, 1887.

Application filed September 7, 1886. Serial No. 212,903. (No model.)

*To all whom it may concern:*

Be it known that I, GREER W. DAVIS, a citizen of the United States, residing at New Albany, in the county of Floyd and State of Indiana, have invented certain new and useful Improvements in Apparatus for Producing Stage Effects; and I do hereby declare the following to be a full, clear, and exact description of the invention, such as will enable others skilled in the art to which it appertains to make and use the same.

My invention relates to electric-light apparatus for producing stage effects in tableaux, emotional, spectacular, and tragic scenes, and other dramatic performances; and its object is to provide an apparatus for conveniently projecting a beam of light from an electric lamp to any portion of a stage, and to readily so vary the scope and range of the light as to embrace the whole stage, if desired.

It is well known that, while being very powerful, the electric light casts very heavy shadows. It is therefore especially applicable for producing surprising and lurid effects, while also serving for all ordinary stage illumination.

To this end the invention consists in a suitably-mounted box or camera provided with a lens or lenses in an adjustable front face in the box and a spherical reflector, as hereinafter more particularly described and claimed.

In the drawings, Figure 1 is a side elevation of the camera, showing the interior, one side being removed. Fig. 2 is a section on line $x$ $x$, looking toward the front; and Fig. 3 is a front elevation.

A is the box or camera, made of any suitable material, supported on a tripod through a universal joint, to allow a free movement of the apparatus in all directions. The bottom of the box is slotted crosswise for the introduction and removal of the electric light, which is hung in a frame, B. It is also provided with vertical slots $a$ $a$ in the sides, for the vertical adjustment of the light, to compensate for the unequal combustion of the carbons when an ordinary arc light is used.

The frame B, carrying the light, is provided with trunnions $b$ $b$, having shoulders and set-screws. When it becomes necessary to adjust the light vertically to bring the arc opposite the center of the spherical reflector, the frame B is raised or lowered, and the trunnions are clamped in the slots $a$ $a$ by set-screws or other suitable devices to hold the light at the proper elevation in the box.

C is a movable front face or wall of the box, carrying a double convex, a plano-convex, or other suitable lens or combination of lenses, C', for concentrating light. Between this wall and the light is a conical polished deflector, $c$, and on the outside are hooks or brackets $c'$ $c'$, for supporting colored slides for varying the effects of the apparatus.

The wall C may be moved backward and forward toward and from the light by any suitable means for condensing the light more or less, as required. In the apparatus shown this wall is secured to a frame, $c^2$ $c^2$, which extends back to the rear of the box, so that it may be readily reciprocated to and from the light by the operator.

The front wall, C, is provided with dovetails or tenons, which slide in corresponding grooves or notches in the top and bottom of the box.

A spherical reflector, D, is mounted at the rear of the box, and should be arranged at focal distance from the light; and that adjustment may be under the control of the operator at all times, I prefer to mount it upon a screw-shank running through the rear wall, and provide the shank with a crank or thumb-nut for conveniently setting the reflector forward or back, as may be desired.

The purpose of the reflector in this apparatus is to assist in condensing rays of light upon the object-lens—*i. e.*, to get an added effect from the rays by concentrating them upon the lens and by returning to the object-lens all rays that may chance to be reflected from the inner polished surface of the same.

The electrical conductors may be connected with the lamp in any of the well-known ways, and need no description here.

Having described my invention, I claim—

1. In an electric-light stage-effect apparatus, the combination of a box provided with vertical slots in its sides, an electric light supported within the box and vertically adjustable by means of said slots, a converging reflector carrying a condensing-lens adjustable to and from the light, and a reflector behind the light, substantially as described.

2. In an electric-light stage-effect apparatus, the combination of a box provided with vertical slots in its sides, an electric light supported within the box and vertically adjustable by means of said slots, a converging reflector carrying a condensing-lens, the reflector and lens being mounted in a face or wall of the box adjustable to and from the light, and the reflector behind the light.

3. The combination, in an apparatus for producing stage effects, of a box, an electric light vertically adjustable therein, a concentrating-reflector in front of the light, and a lens or condenser connected with said reflector, both adjustable toward or from the light, and an adjustable reflector behind the light, substantially as described.

In testimony whereof I affix my signature in presence of two witnesses.

GREER W. DAVIS.

Witnesses:
EVAN B. STOTSENBURG,
GEORGE B. CARDWILL.